: 3,393,981
METHOD OF DECOMPOSING A NUCLEAR FUEL IN A FUSED SALT SYSTEM BY USING NITRIC OXIDE
Hubert H. Vogg, Leopoldshafen, Werner Bähr, Speyer, and Wilhelm Ochsenfeld, Karlsruhe, Germany, assignors to Gesellschaft für Kernforschung m.b.H., a corporation of Germany
No Drawing. Filed Aug. 4, 1965, Ser. No. 477,308
Claims priority, application Germany, Aug. 8, 1964, G 41,295
12 Claims. (Cl. 23—325)

The invention relates to a method of reprocessing and/or separating nuclear fuels, e.g. uranium from plutonium, or uranium from thorium, respectively, which being irradiated nuclear fuels, may also contain cerium, ruthenium, zirconium, niobium. The neuclear fuels are reacted with a preferably oxidizing alkaline melt, after cooling the resulting solidified melt is leached with water, caustic soda solution or the like and then the precipitate is treated with diluted acid so as to cause the nuclear fuel to form a solution, where the fission products to be separated remain as residue. The purpose of an oxidizing alkaline reaction in nuclear fuel reprocessing is a separation of the nuclear fuels from each other, or a separation of the fission products from the nuclear fuels, respectively. In this reaction, part of the substances to be separated from each other is dissolved in the melt, whereas the other part is precipitated as an insoluble precipitate to be separated from the melt. The aforesaid process has been disclosed in U.S. application Ser. No. 367,923, filed May 15, 1964, now U.S. Patent 3,322,509.

It is the aim of this invention to improve the results obtainable by using the suggested alkaline reaction process by refining the steps of the procedure. The reaction was found to be favorably carried out in the weakly alkaline to neutral range. Thus, under the invention the alkalinity of the solution during the reaction is maintained, at least approximately, at a level predetermined for that process. Normally, in the course of the reaction the alkalinity of the melt—when a pure nitrate melt by slow decomposition of the nitrate is used—is steadily increased. In order to counteract the slow decomposition of the nitrate one may, e.g. introduce nitric oxide into the melt.

Yet, the most advantageous pH of the melt (pH of the melt in this case shall mean the value measured after dissolution of the melt with water) during the reaction largely depends upon the type of melt and the oxidizing agents employed. The range extends from weakly acids (pH∼4) to the alkaline range (pH∼8–9).

Therefore, the optimum degree of alkalinity of the melt is determined in simple preliminary experiments for each reaction process.

To separate cerium from the nuclear fuel it is useful, e.g. to work in a reactively strong alkaline medium, i.e. only very small amounts of NO must be introduced and the work should be carried out at a temperature as high as possible.

In contrast, it is an advantage for the segregation on zirconium to carry out the reaction of the nuclear fuel in the neutral range. This may be attained, e.g., by carrying out the reaction for about half an hour at a temperature of about 500° C. and a rate of NO introduction of one bubble/minute for a quantity of about 2 g. of melt.

It is of special importance for every method of reprocessing to separate the fission products contained in the fuel as far as possible. In addition to the fission products mentioned above it is also necessary to separate from the fissile material the radioactive isotopes of iodine generated in nuclear fission. In the familiar process of reprocessing employing concentrated or diluted acids to dissolve the nuclear fuels, the major part of the fission iodine is liberated and thus has to be recaptured afterwards from the waste gas by absorption-towers or silver reactors. Now, in a development of the methods under the invention it was found out that fission iodine may also be separated from the nuclear fuel in the particularly simple manner, separating the iodate formed out during the reaction from the nuclear fuel precipitate prior to the treatment with acid by leaching out the melt.

In alkaline reaction the fission iodine contained in the nuclear fuel is converted into iodate which afterwards is practically completely dissolved when the precipitated or solidified material of the melt is leached out. Only after leaching and separating from the nuclear fuel precipitate, the nucelar fuel precipitate is treated with diluted acid for further reprocessing, where the nuclear fuel then is dissolved, whereas the rest of the fission products to be separated remain as a residue.

More than 99 percent of the fission iodine remain captured in the aqueous extract of the material of the melt. Only a very small portion of the fission iodine is set free so that possibly, i.e. in smaller reprocessing plants, no installations are necessary for the separation of fission iodine from the waste gases.

Finally, it has become evident that it is possible by using the process under the invention to separate also the fission products Sr and Ba from the nuclear fuel, if the melt for the reaction with the nuclear fuel, at least in part, consists of alkaline earth salts. Ba and Sr deserve attention especially because a very high yield of Ba is generated in nuclear fission and Sr, because of its isotope Sr–90 with a halflife of 28 years, raises considerable problems of waste storage.

In the reaction of the fuel, e.g. the uranium fuel, with the oxidizing alkaline melt containing alkaline earths, an alkaline earth uranate is produced which forms an insoluble precipitate in the melt and may be separated from it together with the fission products insoluble in the melt by direct filtration or by leaching the cooled down melt (solidified melt), e.g. by using water.

The fission products Sr and Ba are soluble in the alkaline earth melt. They may thus be separated from the nuclear fuel precipitate together with the also soluble fission products cesium, molybdenum, and iodine with the excess melt. After treatment of the precipitate with diluted nitric acid, where only the nuclear fuel is dissolved, the fission products Zr, Nb, Ru and Ce remain as an insoluble residue.

The oxidizing alkaline melt containing alkaline earths preferably used for the reaction with the nuclear fuel are alkaline nitrate melts containing magnesium nitrate with different quantities of Li, Na, K nitrate added. In this way, the nuclear fuel preferably reacts with the alkaline earth salt which makes it possible—depending upon the alkaline nitrate composition of the melt—to adjust the solidification temperature of the melt within wide ranges. This possibility is of special importance when in the process of extraction care has to be taken because of temperature sensitive components. Thus, e.g. it should be observed in the presence of cerium that the temperature of the melt may not greatly exceed 300° C. because the cerium nitrate produced is stable only up to 350° C.

Under certain conditions it may also be favorable to separate the nuclear fuel precipitate from the surplus melt after the reaction in a centrifuge. It is a particular advantage to design a centrifuge so as to make it a reaction vessel at the same time, i.e. to have the nuclear fuel heated up with an oxidizing alkaline melt in a vessel for the reaction and centrifuge it in the same vessel after the reaction process. In this case it is useful to provide a common container for all or at least for several centrifuging vessels to store the liquids containing the fission products from the centrifuging vessel.

By the means of a different execution of the method under the invention it is possible to filter the precipitate generated in the reaction process directly out of the melt which is still liquid. In any case, this offers the advantage of requiring no addition of other materials to the process, such as water, solvent or the like, which may then become radioactively contaminated and have to be stored too, under certain circumstances. Moreover, it is possible to direct filtration to attain improvements with respect to decontamination of various fission products (Zr, Ru).

The individual steps of the process are explained in the following paragraphs on the basis of examples. The quantities and figures given in this connection do not imply any restriction of the invention, however. Rather may the process be successfully executed in the modified version under the guiding principles set forth above.

Example 1.—Separation of iodine 1.81 g. $UO_2$ were irradiated in a reactor for one hour at a flux of $6.5 \times 10^{12}$ N/cm.$^2$ sec. and made to react after three weeks as described herein. 99.3 percent of the iodine activity were measured in the aqueous extract, whereas 0.6 percent remained with the uranium precipitate and only 0.02 percent could be determined in the waste gases. Identical results were obtained with carrier amounts as well as without.

Example 2.—Separation of the fission products Ba, Sr 1 g. of $UO_2$ irradiated in a reactor for a short time was intimately mixed with such quantities of inactive fission products as to make the ratio between fuel and fission products correspond to a burnup of 100,000 mwd./ton. Afterwards the $UO_2$ was mixed with 8.64 g. Mg $(NO_3)_2 \times 6H_2O$ and 5.00 g. $NaNO_3$ and made to react for two hours at 200° C. After reaction the salt was sucked off through a G4-fritted-glass filter and rewashed with half the quantity of the salt mixture. After cooling the precipitate was washed with ammonium nitrate washing solution and dissolved in 1 N nitric acid. The separated melt filtrate as well as the nuclear fuel solution obtained were analyzed for Sr and Ba activities, and decontamination factors >10 were found for these two elements.

We claim:
1. In the method of treating nuclear fuels by decomposing a nuclear fuel in a fused alkaline salt system containing oxidizing agents, and separating said fuel from said salt system, the improvement of maintaining the pH of the melt at a value ranging from weakly acid to alkaline by introducing nitric acid into said melt.

2. Improvement according to claim 1 which comprises maintaining the pH at a value ranging from weakly acid to weakly alkaline.

3. Improvement according to claim 1 which comprises maintaining the pH at a value ranging from 4–9.

4. In the method of treating nuclear fuels by decomposing a nuclear fuel in an alkaline salt system containing an oxidizing agent, obtaining a cooled melt of said salt, oxidizing agent and fuel from said decomposing step, and extracting said solid cooled melt with an acid to dissolve said nuclear fuel and to leave the fission products as residue, the improvement of maintaining the pH of the melt at a value ranging from weakly acid to alkaline by introducing nitric oxide into said melt.

5. In the method of treating nuclear fuels by decomposing a nuclear fuel in an alkaline salt system containing an oxidizing agent, obtaining a cooled melt of said salt, oxidizing agent and fuel from said decomposing step, leaching said cooled melt with water and/or caustic soda solution and treating the nuclear fuel remaining after said leaching with acid to dissolve said nuclear fuel and to leave the fission products as residue, the improvement of maintaining the pH of the melt at a value ranging from weakly acid to alkaline by introducing nitric oxide into said melt.

6. Improvement according to claim 1 wherein said melt contains an alkaline earth metal salt.

7. Improvement according to claim 6 which comprises adjusting the temperature of the alkaline salt system by addition thereto of a member selected from the group consisting of salts of Li, Na, and K.

8. Improvement according to claim 4 which comprises separating the nuclear field precipitate from the surplus melt by centrifugation.

9. Improvement according to claim 1 which comprises separating said fuel from the molten salt system by fitration.

10. Improvement according to claim 8 which comprises effecting said decomposition and centrifugation in the same vessel.

11. Improvement according to claim 1 for separating cerium from the nuclear fuel which comprises maintaining said pH at a relatively high pH value.

12. Improvement according to claim 1 for separating zirconium from the nuclear fuel which comprises maintaining said pH in the neutral range.

References Cited

UNITED STATES PATENTS 3,112,275   11/1963   Pollock et al. _____ 252—301.1

CARL D. QUARFORTH, *Primary Examiner.*

S. J. LECHERT, JR., *Assistant Examiner.*

UNITED STATES PATENT OFFICE
CERTIFICATE OF CORRECTION

Patent No. 3,393,981                              July 23, 1968

Hubert H. Vogg et al.

It is certified that error appears in the above identified patent and that said Letters Patent are hereby corrected as shown below:

Column 1, line 17, "neuclear" should read -- nuclear --; line 59, "on" should read -- of --. Column 3, line 53, "acid" should read -- oxide --.

Signed and sealed this 23rd day of December 1969.

(SEAL)
Attest:

Edward M. Fletcher, Jr.                      WILLIAM E. SCHUYLER, JR.
Attesting Officer                               Commissioner of Patents